July 7, 1931. A. A. ROSS 1,813,819
GEAR WHEEL
Filed April 27, 1927
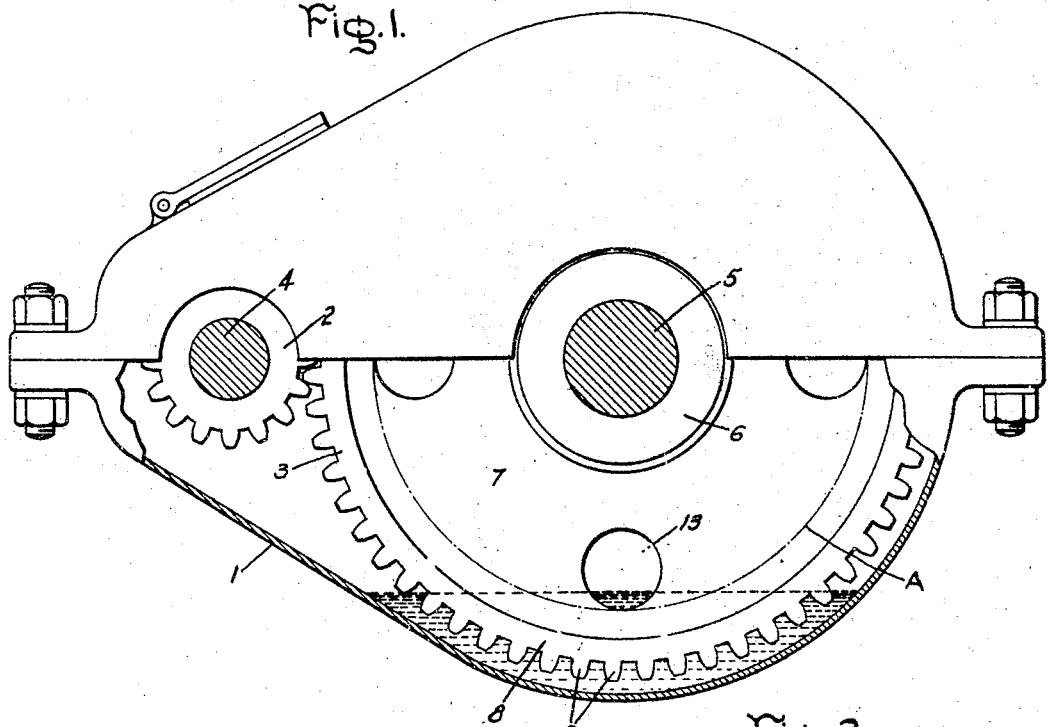
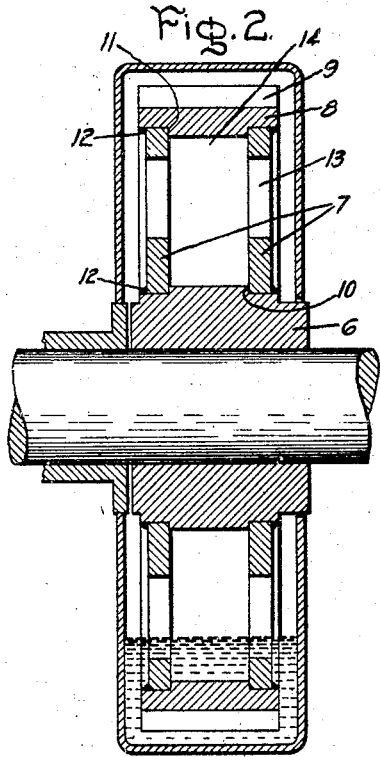
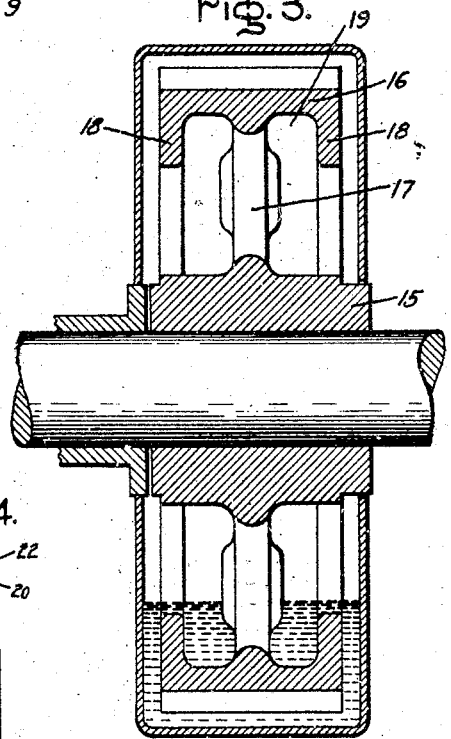
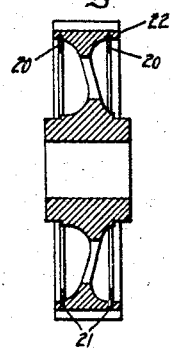
Inventor:
Aubrey A. Ross,
by
His Attorney.

Patented July 7, 1931

1,813,819

UNITED STATES PATENT OFFICE

AUBREY A. ROSS, OF MARBLEHEAD, MASSACHUSETTS, ASSIGNOR TO GENERAL ELECTRIC COMPANY, A CORPORATION OF NEW YORK

GEAR WHEEL

Application filed April 27, 1927. Serial No. 187,070.

The present invention relates to metal gear wheels such as those used in connection with railway motors for example, although it is not limited to gear wheels for this use.

In connection with such metal gear wheels, it is desirable to provide a gear wheel structure which is nonresonant and heretofore various arrangements have been proposed for accomplishing this result. Such arrangements, however, with which I am familiar have either been difficult and impractical to attach or have added materially to the cost of the gear wheel and these features have stood in the way of their general adoption and use.

One object of my present invention is to provide an improved gear wheel which in operation is non-resonant and which can be manufactured at a cost but little if any greater than ordinary resonant gear wheels.

A further object of my invention is to provide an improved gear wheel which is fabricated from a number of pieces of material whereby, as is pointed out hereinafter, I am enabled to provide a satisfactory gear wheel at a reasonable cost having a forged steel tire or rim of uniform structure free from casting defects of the usual cast steel gear and the dangerous mounting shrink strains sometimes found in the composite type gear, which consists of a cast iron or steel hub with a forged steel tire shrunk thereon.

For a consideration of what I believe to be novel and my invention, attention is directed to the accompanying description and the claims appended thereto.

In the drawings, Fig. 1 is a side elevation of a casing containing a railway motor gear wheel embodying my invention and a pinion, the casing being partly broken away; Fig. 2 is a transverse sectional view of the construction shown in Fig. 1; Fig. 3 is a transverse sectional view of a modification; and Fig. 4 is a detail view of another modification.

Referring to the drawings, 1 indicates a gear casing in which is located a pinion 2 which meshes with a gear wheel 3, the pinion and gear wheel being carried by suitable shafts 4 and 5. The arrangement illustrated is that of a usual railway motor gear drive. Gear wheel 3, shown in side elevation in Fig. 1, and in section in Fig. 2, embodies my invention.

According to my invention, I so construct the gear wheel that there are provided inwardly-projecting walls at the two sides of the tire or rim of the gear wheel which form with the inner surface of the tire or rim an inwardly facing open pocket. I then provide in the gear casing sufficient oil or grease so that when the gear wheel is rotating the pocket will become filled with the oil or grease. When the pocket is filled with the oil or grease, I have found that the gear wheel becomes non-resonant, all ring being taken out of it.

Referring specifically to the structure of gear wheel 3 shown in Figs. 1 and 2, it comprises a hub 6, a web 7, and a tire 8, the tire being provided with gear teeth 9. Web 7 comprises two annular plates which engage shoulders 10 and 11 on the hub and tire. The hub, plates and tire are fastened together by fused metal, for example, by welding as is indicated at 12. In the web plates are circumferentially-spaced holes 13 located sufficiently far from the inner surface of tire 8 so that there is provided a continuous annular pocket 14 in which the heavy oil or grease may collect. This pocket is indicated by the dot and dash circle A in Fig. 1. When the gear wheel is rotating, pocket 14 becomes entirely filled with the oil or grease, the same being held therein by centrifugal force. And as already pointed out, this serves to render the gear wheel non-resonant.

By fabricating a gear wheel after the manner shown in Figs. 1 and 2, the same being formed from a hub 6, two web plates, and a tire 8, I am enabled to construct the gear wheel at reasonable cost with a forged steel tire or rim and at the same time provide the annular pocket 14 whereby the gear wheel is rendered non-resonant. In constructing the gear wheel, the hub may be cast from soft cast steel, the web plates may be formed of standard steel plate material of suitable thickness, while the tire may be formed of a grade of steel suitable for heat treating to provide the gear teeth.

The feature of my invention which relates to rendering the gear wheel non-resonant may be applied to any type of gear wheel, it being not limited to a fabricated gear wheel as shown in Figs. 1 and 2. In Fig. 3 this feature of my invention is shown applied to a railway motor gear of a usual construction comprising a hub 15 and a tire 16 connected by integral spokes 17. In this construction, tire 16 is provided with walls forming inwardly-projecting flanges 18 which form with the inner surfaces of tire 16, an annular pocket 19 corresponding to pocket 14 of Figs. 1 and 2.

Fig. 4 illustrates a further modification wherein flanges 20 for providing the pocket are in the form of rings which are held in grooves 21 in the wheel rim 22. This construction is well adapted for use with solid forged gears. In constructing gear wheels of this type, grooves 21 may be cut around the rim before the gear is treated to harden it, then after the gear has been treated, the rings for forming the flanges, which rings may be split suitably, may be snapped into the grooves.

In connection with the Fig. 4 construction, the rings 20 in themselves function to render the gear wheel non-resonant in that, being pieces separate from the gear wheel and not permanently attached thereto, they have a period of vibration different from that of the gear wheel itself and hence tend to dampen out vibration of the gear wheel. In other words, the gear wheel and the rings cooperate to produce a non-resonant structure.

In the use of the invention, there is provided in the gear casing sufficient oil or grease over and above that required for lubricating the gear teeth, to fill the annular pocket 14 or 19, and such pocket is quickly filled after the gear wheel starts to rotate. In the use of the invention, therefore, it is only necessary to provide in the usual gear casing sufficient oil or grease. The functioning of the gear wheel in rendering itself non-resonant is then automatic.

From a structural standpoint my invention possesses great advantages, because in the case of a standard gear wheel as is shown in Fig. 3 it is necessary merely to provide the flanges 18, a thing which can be done at but slight additional cost; and in the case of the fabricated gear wheel as shown in Figs. 1 and 2 it is necessary merely to locate suitably the holes 13. This means that in either case the non-resonant feature of my invention can be provided at but slight additional cost.

The construction shown in Fig. 4 is not claimed herein specifically, since it forms the subject matter of and is claimed in my application Serial No. 433,453, filed March 5, 1930, which application is a continuation in part of the present application.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. The combination of a casing, a gear wheel which runs therein, said gear wheel being provided with walls which form an open, inwardly-facing pocket, and lubricant in the casing which fills the casing normally to a point above the level of the pocket whereby when the gear wheel is running, the pocket becomes filled with lubricant so as to render the gear wheel non-resonant.

2. The combination of a gear wheel having a rim, inwardly-extending walls on the rim which provide an open pocket, a casing in which the gear wheel runs, and lubricant in the casing which fills the casing normally to a point above the level of the pocket whereby when the gear wheel is running, the pocket becomes filled with lubricant so as to render the gear wheel non-resonant.

In witness whereof, I have hereunto set my hand this 25th day of April, 1927.

AUBREY A. ROSS.